US009896323B2

(12) United States Patent
Rasmussen et al.

(10) Patent No.: US 9,896,323 B2
(45) Date of Patent: Feb. 20, 2018

(54) BEVERAGE DISPENSING ASSEMBLY WITH FLEXIBLE VALVE

(71) Applicant: CARLSBERG BREWERIES A/S, Copenhagen V (DK)

(72) Inventors: Jan Norager Rasmussen, Olstykke (DK); Steen Vesborg, Gentofte (DK)

(73) Assignee: CARLSBERG BREWERIES A/S, Copenhagen V (DK)

( * ) Notice: Subject to any disclaimer, the term of this patent is extended or adjusted under 35 U.S.C. 154(b) by 0 days.

(21) Appl. No.: 15/312,816

(22) PCT Filed: May 22, 2015

(86) PCT No.: PCT/EP2015/061352
§ 371 (c)(1),
(2) Date: Nov. 21, 2016

(87) PCT Pub. No.: WO2015/177328
PCT Pub. Date: Nov. 26, 2015

(65) Prior Publication Data

US 2017/0190560 A1 Jul. 6, 2017

(30) Foreign Application Priority Data

May 23, 2014 (EP) .................................... 14169623

(51) Int. Cl.
*F16K 11/04* (2006.01)
*B67D 1/14* (2006.01)
(Continued)

(52) U.S. Cl.
CPC ........... *B67D 1/1438* (2013.01); *B67D 1/127* (2013.01); *B67D 1/1277* (2013.01);
(Continued)

(58) Field of Classification Search
USPC .................................................... 137/625.33
See application file for complete search history.

(56) References Cited

U.S. PATENT DOCUMENTS 4,475,566 A * 10/1984 Haines ...................... B67B 7/26
137/318
4,700,926 A * 10/1987 Hansen .................. F16L 37/42
251/149.8
(Continued)

FOREIGN PATENT DOCUMENTS

| | | |
|---|---|---|
| EP | 1982951 | 10/2008 |
| WO | WO2001/092142 | 12/2001 |

(Continued)

OTHER PUBLICATIONS

International Search Report on corresponding PCT application (PCT/EP2015/061352) from International Searching Authority (EPO) dated Aug. 4, 2015.
(Continued)

*Primary Examiner* — John Fox
(74) *Attorney, Agent, or Firm* — Klein, O'Neill & Singh, LLP

(57) ABSTRACT

Assembly comprising:—a beverage dispensing line (20) defining at a dispensing end (46) thereof an inner circular flow area having a first diameter;—an upstream valve part (26) connected to said dispensing end, the upstream part having an outwardly oriented snap lock member (44);—a flexible downstream valve part (28) defining a beverage outlet at its downstream end, having an inwardly oriented snap lock member cooperating with the outwardly oriented snap lock member, the downstream valve part including a cylindrical plug (36) and defining a passage from the dispensing end past the plug to the beverage outlet, the plug defining a downstream section defining a second diameter larger than the first diameter, and defining an upstream
(Continued)

section defining a third diameter equal to or smaller than the first diameter, connected to the downstream section, a tap handle (14) operating the downstream valve part between a dispensing position, an intermediate non-dispensing position and a final non-dispensing position.

15 Claims, 5 Drawing Sheets

(51) Int. Cl.
*B67D 1/12* (2006.01)
*B67D 3/04* (2006.01)

(52) U.S. Cl.
CPC .......... *B67D 1/1411* (2013.01); *B67D 1/1422* (2013.01); *B67D 3/04* (2013.01)

(56) References Cited

U.S. PATENT DOCUMENTS 4,757,919 A * 7/1988 Smazik ................ B67D 1/0835
222/129.1
5,222,716 A * 6/1993 Perrier ...................... B08B 9/32
251/347
5,950,985 A * 9/1999 Petterson ................ F16L 27/04
251/149.1

FOREIGN PATENT DOCUMENTS

WO WO2007/019850 2/2007
WO WO2008/125115 10/2008
WO WO2010/086275 8/2010

OTHER PUBLICATIONS

Written Opinion on corresponding PCT application (PCT/EP2015/061352) from International Searching Authority (EPO) dated Aug. 4, 2015.

* cited by examiner

BEVERAGE DISPENSING ASSEMBLY WITH FLEXIBLE VALVE

CROSS-REFERENCE TO RELATED APPLICATIONS

This application is the national phase entry, under 35 U.S.C. Section 371(c), of International Application No. PCT/EP2015/061352, filed May 22, 2015, claiming priority from European Application No. 14169623.7, filed May 23, 2014. The disclosures of the International Application and the European Application from which this application claims priority are incorporated herein by reference in their entireties.

FEDERALLY SPONSORED RESEARCH OR DEVELOPMENT

Not Applicable

BACKGROUND

This invention relates to a beverage dispensing assembly and a method of dispensing beverage.

The applicant company produces and sells a professional draught beer system named DraughtMaster™ comprising a beverage dispensing system and a chill chamber in which the keg or pack containing carbonated beer is received. The keg or pack containing carbonated beer comprises a flexible bottle or bag, which is exposed to an elevated pressure from the outside for dispensing the beer. The flexible bottle or bag is connected through a dispensing line to a shut-off valve, which is ducted through a channel of the beverage dispensing system and is received in and operated by means of a tap handle of a tapping head housing for operating the shut-off valve between an open and a closed position, i.e. between a beverage dispensing position and a non-beverage dispensing position.

The international patent application WO 2001/092142 A1 discloses a drink dispenser assembly comprising a dispensing line and a shut-off valve. The shut-off valve comprises a first sleeve and a second sleeve which first sleeve is provided with an inlet to an upstream part of the dispensing line and an outlet. The second sleeve is provided with an inlet which interacts with the outlet of the first sleeve and with an outlet. Coupling means are arranged on one of the sleeves which can be moved by the coupling means between a flow position, in which the outlet of the first sleeve is in fluid communication with the inlet of the second sleeve, and a shut-off position in which the outlet of the first sleeve is closed off by the second sleeve.

In the applicant company's previously filed European patent application 07388021.3, publication no. EP 1 982 951 A1, published on 22 Oct. 2008, and similarly in applicant's previously filed international patent application PCT/DK2008/000140 claiming priority from the above-mentioned European patent application, a technique of joining a separate valve element to a sealed-off dispensing line, after the valve element and the dispensing line have been introduced into the tapping head housing as separate elements, is described as the joining is established the first time the tap handle of the tapping head housing is moved from its closed position to its open position.

A later international patent application PCT/EP2010/050692, published on the 5 August as WO 2010/086275 A1, describes a beverage dispensing assembly including a dispensing line and a valve element. The valve element comprises an upstream valve part, a flexible valve part and a downstream valve part. The downstream valve part includes a plug for sealing off a dispensing end of the dispensing line.

The present invention generally relates to the technical field of beverage dispensing assemblies for carbonated beverages including a dispensing line and valve parts cooperating with the dispensing line for opening and closing the dispensing line. In relation to carbonated beverages stored at elevated pressure, the sudden pressure drop between the elevated pressure upstream of the valve and the atmospheric pressure downstream of the valve may cause excessive foaming of the beverage. The foaming is caused by turbulence in the beverage flow in the valve which in turn is due to the high flow velocities generated by the pressure difference between the upstream part of the valve and the downstream part of the valve. The intensity of the turbulence is also depending on other factors such as the extent of stagnation paints in connection with location where the flow detaches from the surface of the valve. At such locations strong vortexes may occur which causes foaming.

It is therefore an object of the present invention to provide an improved beverage dispensing assembly which minimizes the amount of foaming generated during dispensing.

SUMMARY OF THE INVENTION

The above objects, the above advantage, and the above feature together with numerous other objects, advantages, and features, which will be evident from the below detailed description of the present invention, are, in accordance with a first aspect of the present invention, obtained by a beverage dispensing assembly to be used in combination with a tapping head, the tapping head including a tapping head housing and a tap handle, the beverage dispensing assembly comprising:

a dispensing line having a dispensing end and a keg connection end, the dispensing line being flexible and defining at the dispensing end an inner substantially circular flow area having a first diameter, an upstream valve part connected to the dispensing line adjacent the dispensing end, the upstream part having an outwardly oriented snap lock member, and a downstream valve part defining a beverage outlet at its downstream end, being flexible and having an inwardly oriented snap lock member capable of cooperating with the outwardly oriented snap lock member, the downstream valve part including a plug and defining a passage from the dispensing end past the plug to the beverage outlet, the plug defining a downstream section defining a second diameter being larger than the first diameter, the plug defining an upstream section connected to the downstream section and being substantially circular cylindrical defining a third diameter being equal to or slightly less than the first diameter, the downstream valve part being operable via the tap handle between a beverage dispensing position, an intermediate non-beverage dispensing position and a final non-beverage dispensing position, wherein when in the final non-beverage dispensing position, the outwardly oriented snap lock member engages with the inwardly oriented snap lock member and arresting the downstream valve part in relation to the upstream valve part, the upstream section of the plug being inserted into the dispensing end and the downstream section of the plug applying a sealing force onto the dispensing end, when in the intermediate non-beverage dispensing position; the outwardly oriented snap lock member disengages from the inwardly oriented snap lock member, the upstream section of the plug being inserted into the dispensing end and the downstream section of the plug being spaced apart from the dispensing end, and when in the beverage dispensing position, the outwardly oriented snap lock member disengages from the inwardly oriented snap lock member and both the upstream section of the plug and the downstream section of the plug being spaced apart from the dispensing end for allowing beverage to flow from the dispensing line to the beverage outlet.

The dispensing end of the dispensing line, the upstream valve part and the downstream valve part makes up the valve of the beverage dispensing assembly. The keg connection end of the dispensing line is fixated to a keg or container which is filled by beverage. The container is typically collapsible for use with a pressurized beverage dispensing system and the beverage is typically a carbonated beverage. The dispensing line may be permanently fixated to the keg or container but also provided as a separate part which is attached to the keg or container during installation of the keg or container in the beverage dispensing system. The flow area of the dispensing line should be substantially circular, i.e. allow for some deviation from the perfectly circular shape.

The tapping head housing typically encloses the dispensing end of the dispensing line, the upstream valve part and the downstream valve part. The tap handle constitutes, the part of the tapping head which the user swings between a horizontal and vertical orientation in order to open and close the valve and thereby control the beverage dispensing in a well known manner. The dispensing line may be any tubing of suitable size and material for conducting beverage.

The upstream valve part is attached about the outwardly oriented surface of the dispensing line adjacent the dispensing end for the purpose of interacting with the downstream valve part. The downstream valve part comprises the plug which controls the beverage flow from the dispensing end of the dispensing line. The upstream valve part and the downstream valve part have cooperating snap lock members which together form a snap lock mechanism.

The applicant has surprisingly found out that by avoiding any vortex formation during the first few moments of opening the beverage flow, foaming of the beverage may be significantly reduced. A vortex formed early during the opening procedure may have a sufficiently large momentum to remain and disturb the flow for several seconds after the valve has reached full open position. When regarding valves which operate by removing a plug from an orifice, during the opening sequence, a small asymmetrical gap may be generated between the dispensing end and the plug where the beverage will stream through before the valve opens up an annular opening between the plug and the dispensing end. At this location, a vortex is generated which will disturb the flow and cause turbulence which will cause foaming even after the valve is full open.

In order to avoid this vortex, an opening procedure of three states is suggested. In the final non-beverage dispensing position, the plug is caused to apply a sealing force onto the dispensing end of the dispensing line for preventing any of the pressurized beverages to leak through the valve. The plug is integral with the downstream valve part, whereas the upstream valve part is fixated, welded or molded to the dispensing line. The sealing force is generated by the snap lock mechanism which, when in the final non-beverage dispensing position, forces the downstream valve part and consequently the plug towards the dispensing end. The downstream valve part should consequently be flexible in order to be able to allow the inwardly oriented snap lock member to snap correctly into an engagement with the outwardly oriented snap lock member of the upstream valve part while allowing the suitable sealing force to be applied by the plug. A suitable material for the downstream valve part and also the upstream valve part is LDPE of a density of 0.92 g/cm$^3$-0.94 g/cm$^3$. A suitable material for the tapping line which should be smooth is MDPE of a density of 0.92 g/cm$^3$-0.95 g/cm$^3$. Alternative materials for the valve parts and the tapping line may be platinum polymer material.

The upstream section of the plug has a circumference corresponding to the inner circumference of the dispensing line, whereas the downstream section of the plug is wider than the inner circumference of the dispensing line. Thus, when in the final non-beverage dispensing position, the wider downstream section of the plug will wedge itself against the dispensing end by the sealing force due to the flexibility of the downstream valve part in combination with the snap lock mechanism constituted by the inwardly oriented snap lock member and the outwardly oriented snap lock member. In this way, the final non-beverage dispensing position is leakage free.

When the user moves the handle, the downstream valve part moves in a downstream direction and the plug follows, the inwardly oriented snap lock member and the outwardly oriented snap lock member will disengage and allow the downstream section of the plug to separate from the dispensing end of the dispending line. No beverage will flow due to the presence of the upper section of the plug in the dispensing line at the dispensing end. Although no pressure-proof seal may be achieved in this way, no significant amount of beverage may pass as the upper section of the plug blocks the passage. This constitutes the intermediate non-beverage dispensing position and will typically be active only for less than a second during the swinging movement of handle.

When the user moves the handle further towards the open position, the valve will be put in the beverage dispensing position. The upstream section of the plug will separate from the dispensing end of the dispensing line in a substantially symmetrical way presenting an annular flow area between the plug and the dispensing end. The flow of beverage will flow through the dispensing end via the annular flow area past the upstream section of the plug and further past the downstream section of the plug towards the outlet of the downstream valve part without encountering any major asymmetries or discontinuations in the flow area. Thus, the generation of stagnation points or flow separation will be very limited as will the occurrence of turbulence and thereby the foaming will be reduced to a minimum.

Closing of the valve is achieved by reversing the above sequence, i.e. moving the downstream valve part via the handle from the beverage dispensing position via the intermediate non-beverage dispensing position to the final non-beverage dispensing position.

According to a further embodiment of the first aspect, the outwardly oriented snap lock member comprises a protrusion and the inwardly oriented snap lock member comprises a groove. Cooperating grooves and protrusions in combination with a flexible downstream valve part define a very suitable snap lock mechanism capable, of engaging when the groove and protrusion are put in registration.

According to a further embodiment of the first aspect, the inwardly oriented snap lock member comprises a protrusion and the outwardly oriented snap lock member comprises a groove. Naturally, the inverse configuration is possible as well and need no further elaborations.

According to a further embodiment of the first aspect, the downstream valve part comprises an indentation for cooperating with the tapping head. In order for the handle to move the downstream valve part, the handle may be connected to a member of the tapping head which engages the indentation of the downstream valve part allowing the downstream valve part to move.

According to a further embodiment of the first aspect, when in the final non-beverage dispensing position, the inwardly oriented snap lock member and the outwardly oriented snap lock member are engaged causing the downstream section of the plug to subject a sealing force onto the dispensing end corresponding to a beverage pressure of 0.1-6 bar, preferably 1-5 bar, more preferably 2-3 bar, most preferably about 3 bar. The above pressure constitutes typical dispensing pressure for carbonated beverages. The plug should preferably apply the same or a higher pressure onto the dispensing end of the dispensing line in order to prevent leakage of beverage.

According to a further embodiment of the first aspect, the third diameter is between 90% and 100% of the first diameter, preferably between 95% and 100% of the first diameter, more preferably between 98% and 100% of the first diameter, most preferably between 99% and 100% of the first diameter. The upstream section of the plug should preferably fill all or most of the flow area of the dispensing line at the dispensing end in order to prevent any significant beverage flow through the valve which could yield the formation of a turbulence enhancing vortex.

According to a further embodiment of the first aspect, the upstream valve part comprises a first flange, the downstream valve part comprises a second flange cooperating with the first flange for guiding the downstream valve part when moving in relation to the upstream valve part and providing a sealing force between the downstream valve part and the upstream valve part. In order to ensure that the downstream valve part and the upstream valve part are sealed together and that the plug assumes a correct position when closing the valve, i.e. avoiding that the plug assumes a skewed and non-sealed position at the dispensing end of the dispensing line, the first and second flanges may interact to guide the downstream valve part when moving in relation to the upstream valve part.

According to a further embodiment of the first aspect, the outwardly oriented snap lock member is located at the first flange and the inwardly oriented snap lock member is located at the second flange. Preferably, the first and second flanges constitute the areas of contact between the downstream valve part and the upstream valve part and consequently, also the position for the inwardly oriented and outwardly oriented snap lock members.

According to a further embodiment of the first aspect, the downstream valve part comprises a third snap lock member and the upstream valve part comprises a fourth snap lock member, the third snap lock member and the fourth snap lock member engaging when in the beverage dispensing position, whereas the third snap lock member and the fourth snap lock member disengage when in the intermediate non-beverage dispensing position or when in the final non-beverage dispensing position. In order to achieve a well defined full open position, additional snap lock members may be used for achieving a snap lock mechanism which will engage when the full open beverage dispensing position is achieved.

According to a further embodiment of the first aspect, the downstream valve part and the plug are integrally cast as a unitary body. Preferably, the downstream valve part and the plug may be of the same material and integrally cast in order to achieve the high precision which will be required for achieving a well defined closing of the valve.

According to a further embodiment of the first aspect, the downstream valve part defines a tapering from the second diameter to the third diameter. In order to allow the downstream section of the plug to wedge into the dispensing end of the dispensing line and to allow a smooth flow when the valve is open, the plug may define a tapered shape in the interconnection between the upstream section and the downstream section.

According to a further embodiment of the first aspect, the third diameter exceeds the first diameter by 1%-100%, preferably 2%-75% more preferably 5%-50%, most preferably 10%-20%. In order to provide a pressure tight seal at the dispensing end, the diameter of the downstream section should exceed at least the inner diameter of the dispensing end.

According to a further embodiment of the first aspect, the upstream valve part is being molded, welded or glued onto the dispensing line. In this way, the positioning of the upstream valve part may be achieved with high accuracy, which in turn is critical for the correct movement of the plug.

According to a further embodiment of the first aspect, the dispensing line, the downstream valve part and the upstream valve part are made of a flexible polymeric material such as PE. The above materials are suitable due to their flexibility.

The above objects, the above advantage, and the above feature together with numerous other objects, advantages, and features, which will be evident from the below detailed description of the present invention, are, in accordance with a second aspect of the present invention, obtained by a method of dispensing beverage by providing a beverage dispensing assembly in combination with a tapping head, the tapping head including a tapping head housing and a tap handle, the beverage dispensing assembly comprising:

a dispensing line having a dispensing end and a keg connection end, the dispensing line being flexible and defining at the dispensing end an inner substantially circular flow area having a first diameter, an upstream valve part connected to the dispensing line adjacent the dispensing end, the upstream part having an outwardly oriented snap lock member, and a downstream valve part defining a beverage outlet at its downstream end, being flexible and having an inwardly oriented snap lock member capable of cooperating with the outwardly oriented snap lock member, the downstream valve part including a plug and defining a passage from the dispensing end past the plug to the beverage outlet, the plug defining a downstream section connected to the downstream valve part and defining a second diameter being larger than the first diameter, the plug defining an upstream section connected to the downstream section and being substantially circular cylindrical defining a third diameter being equal to or slightly less than the first diameter, the downstream valve part being operable via the tap handle between a beverage dispensing position, an intermediate non-beverage dispensing position and a final non-beverage dispensing position, the method comprising the following steps:

operating the downstream section via the tap handle into the final non-beverage dispensing position, thereby engaging the outwardly oriented snap lock member with the inwardly oriented snap lock member and arresting the downstream valve part to the upstream valve part, inserting the upstream section of the plug into the dispensing end and causing the downstream section of the plug to apply a sealing force onto the dispensing end, operating the downstream section via the tap handle into the intermediate non-beverage dispensing position, thereby disengaging the outwardly oriented snap lock member with the inwardly oriented snap lock member, inserting the upstream section of the plug into the dispensing end and spacing the downstream section of the plug apart from the dispensing end, and operating the downstream section via the tap handle into the beverage dispensing position, thereby disengaging the outwardly oriented snap lock member with the inwardly oriented snap lock member and spacing both the upstream section of the plug and the downstream section of the plug apart from the dispensing end for allowing beverage to flow from the dispensing line to the beverage outlet.

The method according to the second aspect is preferably used together with the assembly according to the first aspect.

DETAILED DESCRIPTION OF THE DRAWINGS

Figure 1:
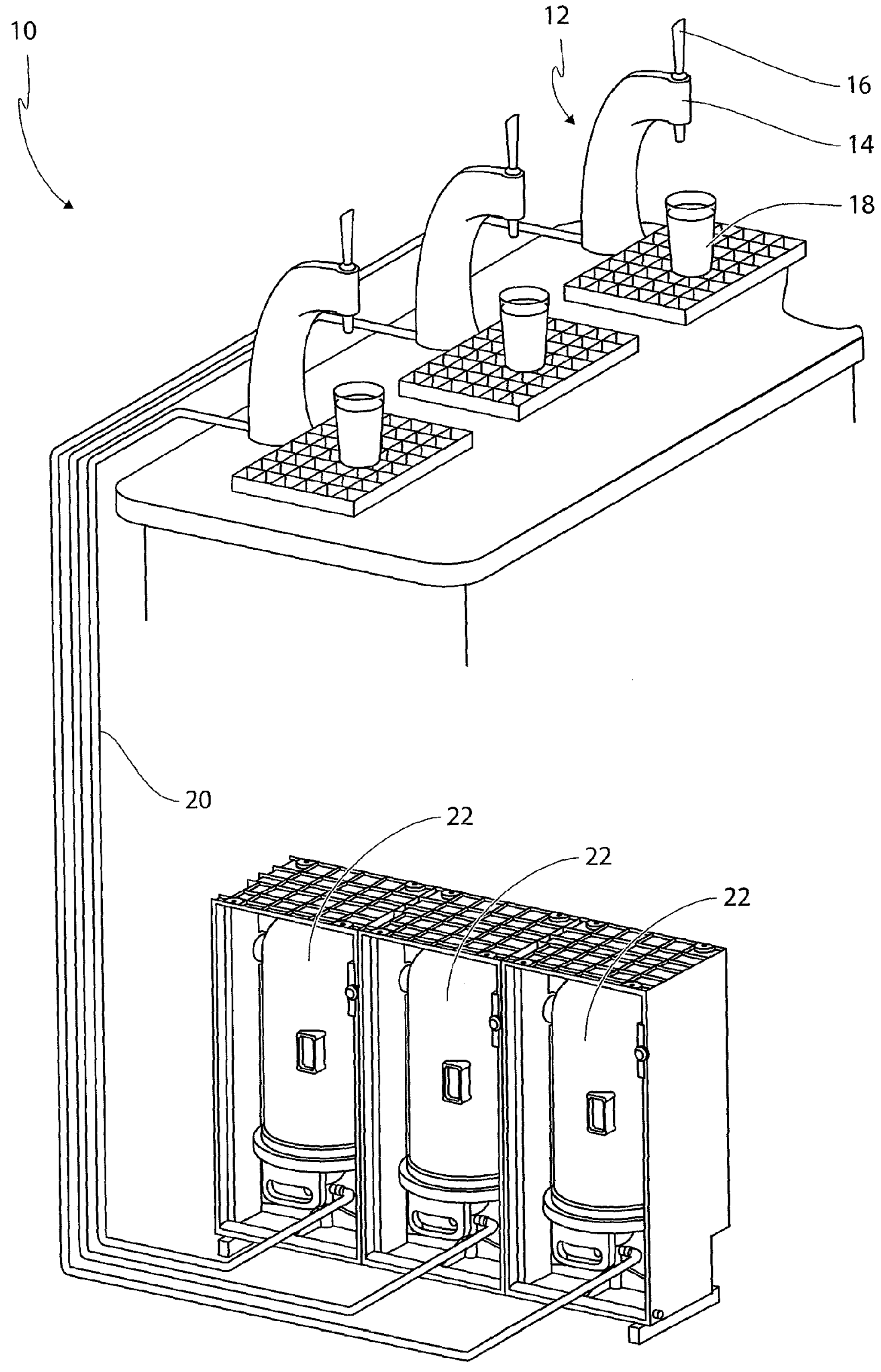
FIG. 1 is a view of a beverage dispensing system.

FIG. 1 shows a perspective view of a beverage dispensing system 10. The beverage dispensing system comprises a bar counter comprising a number of tapping heads 12. Each tapping head 12 comprises a tapping head housing 14 and a tapping handle 16. A beverage glass 18 may be put below the tapping head housing. In order to dispense beverage, the handle 16 is to be operated. Each of the tapping heads 12 is connected by a separate dispensing line 20 to a pressure chamber 22 in which a flexible container (not shown) filled with carbonated beverage is located.

Figure 2B:
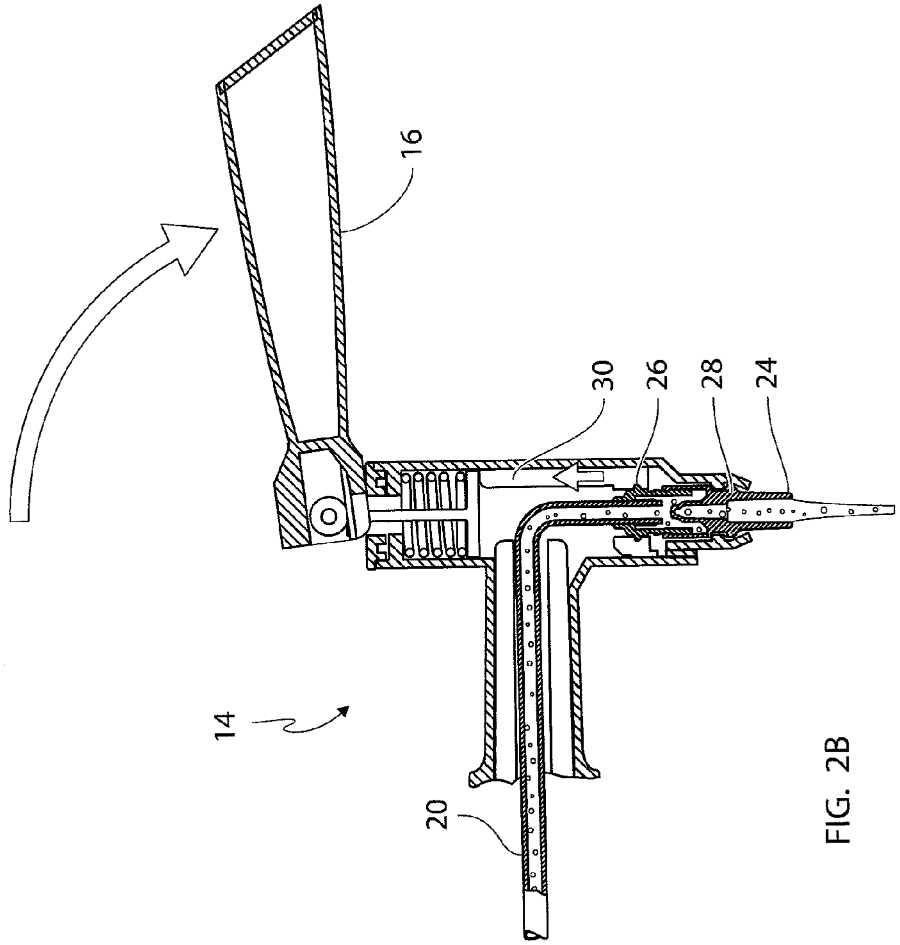
FIG. 2B is a view of a tapping head housing in the beverage dispensing position.
Figure 2A:
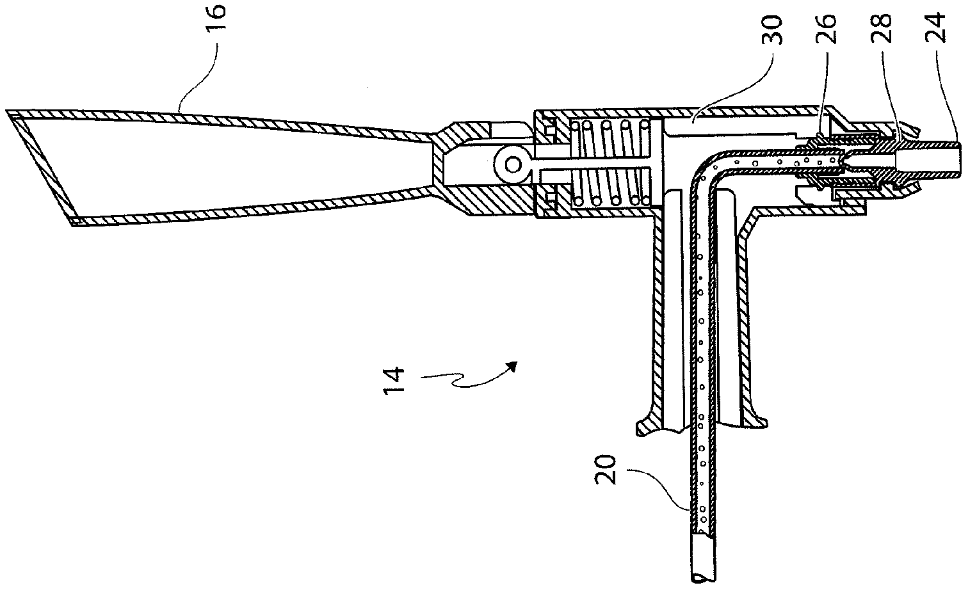
FIG. 2A is a view of a tapping head housing in the non-beverage dispensing position.

FIG. 2A shows a perspective view of a tapping head housing 14 when in the closed position (non-beverage dispensing position). The tapping head housing 14 includes a valve 24 which is currently closed preventing any beverage to flow. The beverage dispensing assembly comprises the valve 24 and the dispensing line 20. The valve 24 comprises an upstream valve part 26 and a downstream valve part 28. The downstream valve part 28 is fixed to the tapping head housing 14, whereas the upstream valve part 26 is connected to a member 30 which in turn is operatively connected with the handle 16.

FIG. 2B shows a perspective view of a tapping head housing 14 when in the open position (beverage dispensing position). The handle 16 has been swung according to the arrow from a horizontal position to a vertical position thereby moving the member 30 upwardly according to the arrow causing the upstream valve part 26 to move in relation to the downstream valve part 28 which as will be explained below will cause the valve 24 to open allowing beverage to flow.

Figure 3A:
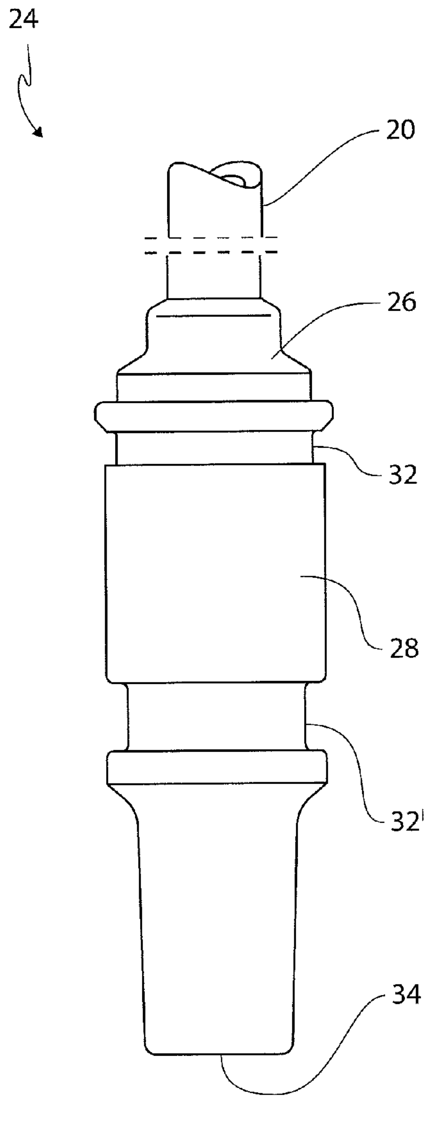
FIG. 3A is a perspective view of the beverage dispensing assembly.

FIG. 3A is a perspective view of a valve 24. The valve 24 comprises the upstream valve part 26 and the downstream valve part 28. The upstream valve part 26 is fixated to the dispensing line 20. The upstream valve part 26 comprises an indentation 32 for engagement with the member (not shown) of the handle (not shown), whereas the downstream valve part 26 comprises an indentation 32' for engagement with the tapping head housing (not shown). The downstream valve part 28 defines a beverage outlet 34.

Figure 3B:
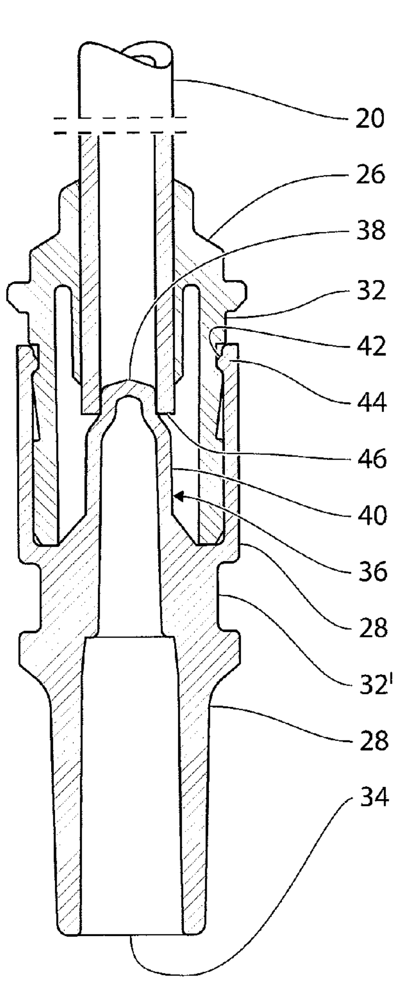
FIG. 3B is a vertical sectional view of the beverage dispensing assembly in the final non-beverage dispensing position.

FIG. 3B is a vertical sectional view of the valve 24 when in the final non-beverage dispensing position, i.e. fully closed. The downstream valve part 28 comprises a plug 36 which in turn comprises an upstream section 38 and a downstream section 40. The downstream valve part 28, which is made of a flexible material, comprises a flange which is fitted with a first snap lock member 42. The upstream valve part 26 comprises a corresponding flange fitted with a second snap lock member 44 compatible with the first snap lock member 42 and together forming a snap lock mechanism. In the present final non-beverage dispensing position, the first snap lock member 42 is engaged with the second snap lock member 44.

The dispensing line 20 extends into the upstream valve part 26 and defines a dispensing end 46. The dispensing end 46 constitutes the end opening of the dispensing line. The upstream section 38 of the plug 36 is circular cylindrical and has a circumference corresponding to the circumference of the dispensing end 46 and in the present final non-beverage dispensing position, the upstream section 38 has been inserted into the dispensing end 46. The downstream section 40 defines a tapering from the upstream section 38 to a circumference exceeding the circumference of the dispensing end 46. In the present final non-beverage dispensing position, the downstream section 40 of the plug 36 applies a sealing pressure onto the dispensing end 46, which sealing pressure is caused by the snap lock mechanism in combination with the flexibility of the downstream section 40.

Figures 3C, 3D, 3E:
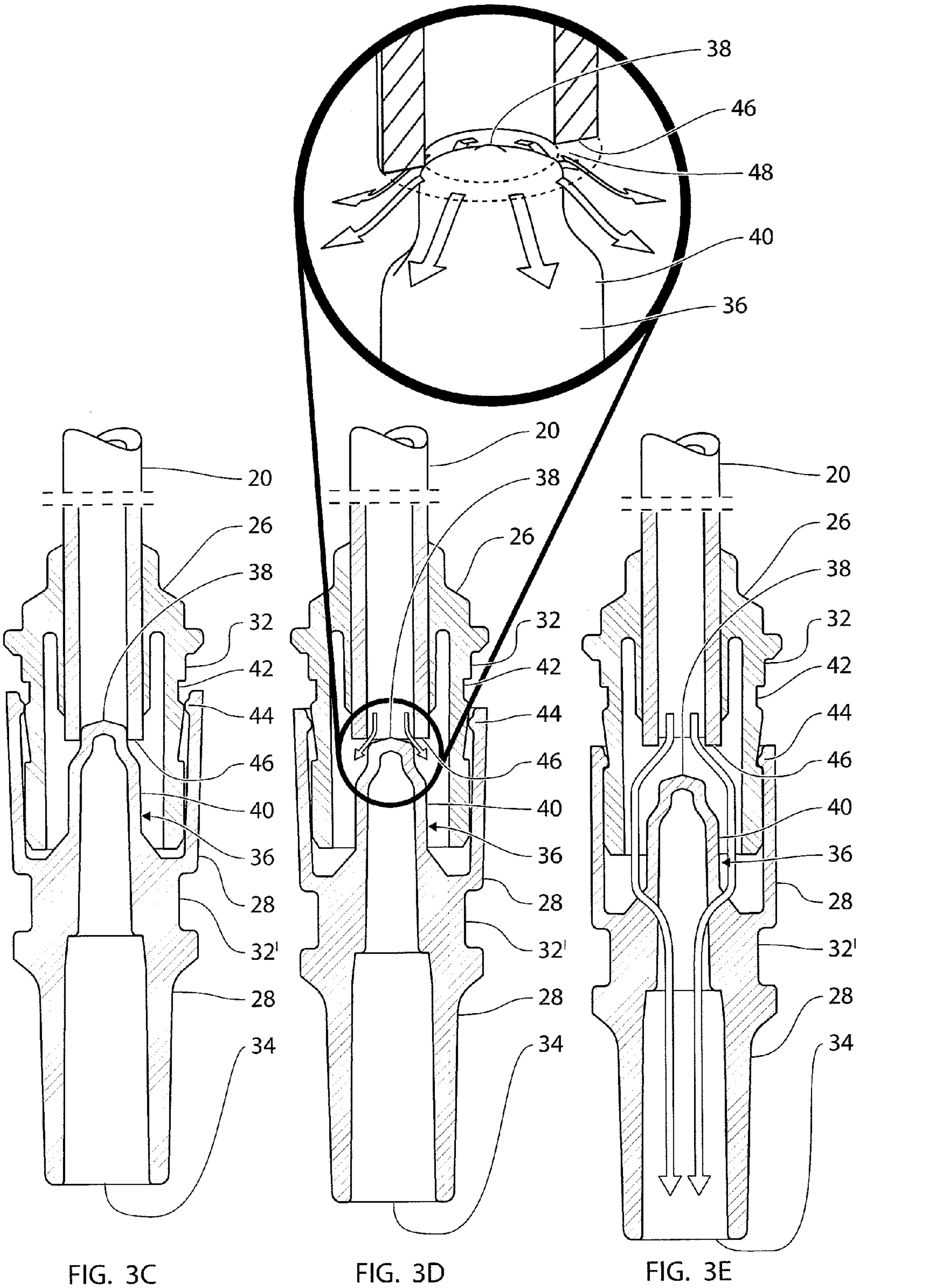
FIG. 3C is a vertical sectional view of the beverage dispensing assembly in the intermediate beverage dispensing position.
FIG. 3D is a vertical sectional view of the beverage dispensing assembly in the beverage dispensing position (semi open).
FIG. 3E is a vertical sectional view of the beverage dispensing assembly in the beverage dispensing position (fully open).

FIG. 3C a vertical sectional view of the valve 24 when in the intermediate non-beverage dispensing position, i.e. on the way between fully closed and open. The user has now operated the handle (not shown) and moved the downstream valve part 26 in relation, to the upstream valve part 28. The first snap lock member 42 has disengaged the second snap lock member 44 and the downstream section 40 of the plug 36 has moved away from the dispensing end 46. No beverage will flow from the dispensing end 46 due to the presence of the upstream section 438 in the dispensing end 46.

FIG. 3C is a vertical sectional view of the valve 24 when in the intermediate non-beverage dispensing position, i.e. on the way between fully closed and open. The user has now operated the handle (not shown) and moved the downstream valve part 26 in relation to the upstream valve part 28. The first snap lock member 42 has disengaged the second snap lock member 44 and the downstream section 40 of the plug 36 has moved away from the dispensing end 46. No beverage will flow from the dispensing end 46 due to the presence of the upstream section 38 in the dispensing end 46; however, due to the lack of a sealing pressure, leakage may occur in case the present position is held for a longer time than a few seconds. Normally, the present position is held for less than a second.

FIG. 3D is a vertical sectional view of the valve 24 when in the beverage dispensing position i.e. an open position, however, the present view does not illustrate the fully open position allowing the maximum beverage flow but a semi-open position yielding only a minor flow. The upstream section 38 of the plug 36 has now moved away from the dispensing end 46 forming an annular gap between the upstream section 38 and the dispensing end 46. The beverage will flow as illustrated by the arrows. A close-up view is available showing the symmetrical annular gap 48. In the present position, no significant stagnation point or flow separation point is achieved and thus the amount of turbulence is kept low.

FIG. 3E is a vertical sectional view of the valve 24 when in the beverage dispensing position i.e. the fully open position when the handle is in the fully horizontal orientation and the plug 36 is spaced apart from the dispensing end 46 allowing a maximum flow. Normally, the transition between fully closed and fully open will take less than one second and dispensing at less than fully open position for a prolonged time is less favored since the beverage will be more prone to foaming due to the smaller flow area. The beverage flow is according to the arrows.

Figure 4:
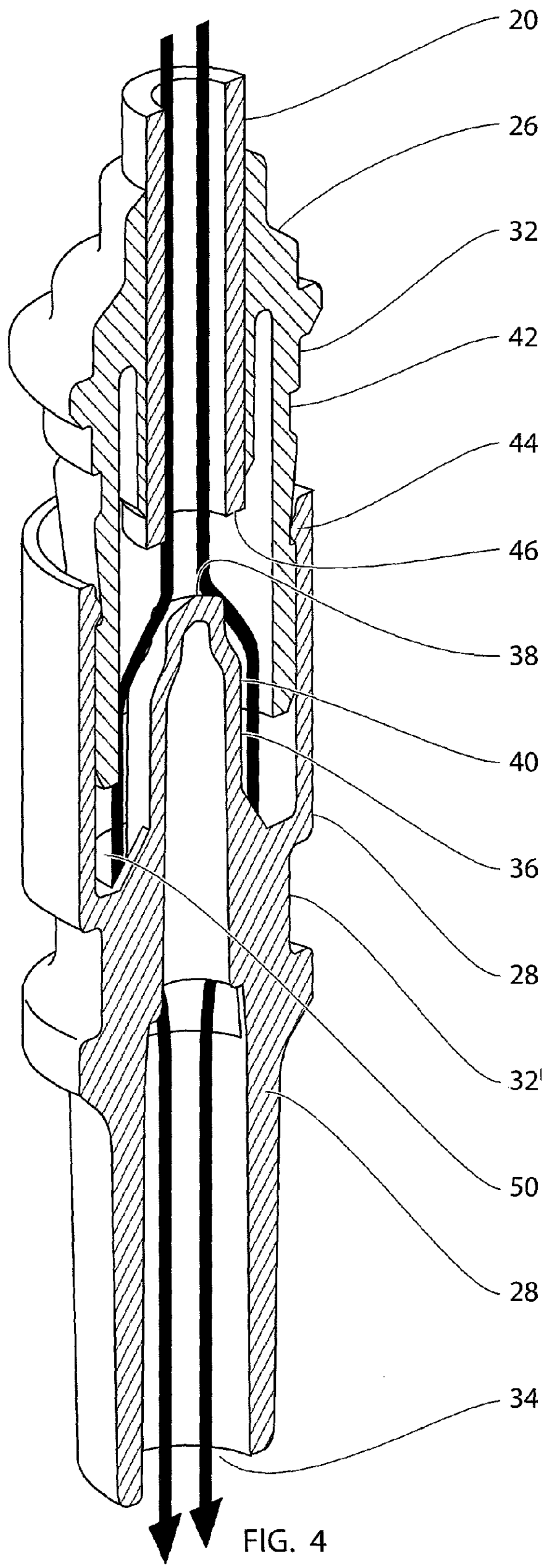
FIG. 4 is a vertical sectional view of the beverage dispensing assembly in the beverage dispensing position.

FIG. 4 is a vertical sectional view of the valve 24 when in the beverage dispensing position. The beverage flow is according to the arrows. The present view illustrates how the plug 36 is held in the downstream valve part 26 and the beverage passes through channels 50 which occupy the larger part of the annular spacing surrounding the plug 36.

It is evident that although the present invention has been illustrated here with reference to particular embodiments of the beverage dispensing assembly, various modifications may be evident to the skilled person.

REFERENCE NUMERALS

10. Beverage dispensing system
12. Tapping head
14. Tapping head housing
16. Handle
18. Beverage glass
20. Dispensing line
22. Pressure chamber
24. Valve
26. Upstream valve part
28. Downstream valve part
30. Member
32. Indentation
34. Beverage outlet
36. Plug
38. Upstream section
40. Downstream section
42. First snap lock member
44. Second snap lock member
46. Dispensing end
48. Annular gap
50. Pass through channel

The invention claimed is:

1. A beverage dispensing assembly to be used in combination with a tapping head, said tapping head including a tapping head housing and a tap handle, said beverage dispensing assembly comprising:

a dispensing line having a dispensing end and a keg connection end, said dispensing line being flexible and defining at said dispensing end an inner substantially circular flow area having a first diameter, an upstream valve part connected to said dispensing line adjacent said dispensing end, said upstream part having an outwardly oriented snap lock member, and a downstream valve part defining a beverage outlet at its downstream end, being flexible and having an inwardly oriented snap lock member capable of cooperating with said outwardly oriented snap lock member, said downstream valve part including a plug and defining a passage from said dispensing end past said plug to said beverage outlet, said plug defining a downstream section defining a second diameter being larger than said first diameter, said plug defining an upstream section connected to said downstream section and being substantially circular cylindrical defining a third diameter being equal to or slightly less than said first diameter, said downstream valve part being operable via said tap handle between a beverage dispensing position, an intermediate non-beverage dispensing position and a final non-beverage dispensing position, wherein when in said final non-beverage dispensing position, said outwardly oriented snap lock member engages with said inwardly oriented snap lock member and arresting said downstream valve part in relation to said upstream valve part, said upstream section of said plug being inserted into said dispensing end and said downstream section of said plug applying a sealing force onto said dispensing end, when in said intermediate non-beverage dispensing position, said outwardly oriented snap lock member disengages from said inwardly oriented snap lock member, said upstream section of said plug being inserted into said dispensing end and said downstream section of said plug being spaced apart from said dispensing end, and when in said beverage dispensing position, said outwardly oriented snap lock member disengages from said inwardly oriented snap lock member and both said upstream section of said plug and said downstream section of said plug being spaced apart from said dispensing end for allowing beverage to flow from said dispensing line to said beverage outlet.

2. The beverage dispensing assembly according to claim 1, wherein said outwardly oriented snap lock member comprises a protrusion and said inwardly oriented snap lock member comprises a groove.

3. The beverage dispensing assembly according to claim 1, wherein said inwardly oriented snap lock member comprises a protrusion and said outwardly oriented snap lock member comprises a groove.

4. The beverage dispensing assembly according to claim 1, wherein said downstream valve part comprises an indentation for cooperating with said tapping head.

5. The beverage dispensing assembly according to claim 1, wherein when in said final non-beverage dispensing position, said inwardly oriented snap lock member and said outwardly oriented snap lock member are engaged causing said downstream section of said plug to subject a sealing force onto said dispensing end corresponding to a beverage pressure of 0.1-6 bar.

6. The beverage dispensing assembly according to claim 1, wherein said third diameter is between 90% and 100% of said first diameter.

7. The beverage dispensing assembly according to claim 1, wherein said upstream valve part comprises a first flange, said downstream valve part comprises a second flange cooperating with said first flange for guiding said downstream valve part when moving in relation to said upstream valve part and providing a sealing force between said downstream valve part and said upstream valve part.

8. The beverage dispensing assembly according to claim 7, wherein said outwardly oriented snap lock member is located at said first flange and said inwardly oriented snap lock member is located at said second flange.

9. The beverage dispensing assembly according to claim 1, wherein said downstream valve part comprises a third snap lock member and said upstream valve part comprises a fourth snap lock member, said third snap lock member and said fourth snap lock member engaging when in said beverage dispensing position, whereas said third snap lock member and said fourth snap lock member disengage when in said intermediate non-beverage dispensing position or when in said final non-beverage dispensing position.

10. The beverage dispensing assembly according to claim 1, wherein said downstream valve part and said plug are integrally cast as a unitary body.

11. The beverage dispensing assembly according to claim 1, wherein said downstream valve part defines a tapering from said second diameter to said third diameter.

12. The beverage dispensing assembly according to claim 1, wherein said third diameter exceeds said first diameter by 1%-100%.

13. The beverage dispensing assembly according to claim 1, wherein said upstream valve part is molded, welded or glued onto said dispensing line.

14. The beverage dispensing assembly according to claim 1, wherein said dispensing line, said downstream valve part and said upstream valve part are made of a flexible polymeric material.

15. A method of dispensing beverage by providing a beverage dispensing assembly in combination with a tapping head, said tapping head including a tapping head housing and a tap handle, said beverage dispensing assembly comprising:

a dispensing line having a dispensing end and a keg connection end, said dispensing line being flexible and defining at said dispensing end an inner substantially circular flow area having a first diameter, an upstream valve part connected to said dispensing line adjacent said dispensing end, said upstream part having an outwardly oriented snap lock member, and a downstream valve part defining a beverage outlet at its downstream end, being flexible and having an inwardly oriented snap lock member capable of cooperating with said outwardly oriented snap lock member, said downstream valve part including a plug and defining a passage from said dispensing end past said plug to said beverage outlet, said plug defining a downstream section connected to said downstream valve part and defining a second diameter being larger than said first diameter, said plug defining an upstream section connected to said downstream section and being substantially circular cylindrical defining a third diameter being equal to or slightly less than said first diameter, said downstream valve part being operable via said tap handle between a beverage dispensing position, an intermediate non-beverage dispensing position and a final non-beverage dispensing position, said method comprising the following steps:

operating said downstream section via said tap handle into said final non-beverage dispensing position, thereby engaging said outwardly oriented snap lock member with said inwardly oriented snap lock member and arresting said downstream valve part to said upstream valve part, inserting said upstream section of said plug into said dispensing end and causing said downstream section of said plug to apply a sealing force onto said dispensing end, operating said downstream section via said tap handle into said intermediate non-beverage dispensing position, thereby disengaging said outwardly oriented snap lock member with said inwardly oriented snap lock member, inserting said upstream section of said plug into said dispensing end and spacing said downstream section of said plug apart from said dispensing end, and operating said downstream section via said tap handle into said beverage dispensing position, thereby disengaging said outwardly oriented snap lock member with said inwardly oriented snap lock member and spacing both said upstream section of said plug and said downstream section of said plug apart from said dispensing end for allowing beverage to flow from said dispensing line to said beverage outlet.

* * * * *